Patented Oct. 4, 1932

1,880,594

UNITED STATES PATENT OFFICE

EDUARD TSCHUNKUR AND ERNST KRACHT, OF COLOGNE-MULHEIM, GERMANY, ASSIGNORS TO GENERAL ANILINE WORKS, INC., OF NEW YORK, N. Y., A CORPORATION OF DELAWARE

PROCESS OF PREPARING 2.2'-DIAMINO-DIPHENYL-4.4'-DISULPHONIC ACID

No Drawing. Application filed July 16, 1931, Serial No. 551,300, and in Germany July 21, 1930.

This invention relates to a process for the manufacture of 2.2'-diamino-diphenyl-4.4'-disulphonic acid.

2.2'-dinitro-diphenyl-4.4'-disulphonic acid has been described in the publication of Ullmann and Prentzel (Berichte 38, page 726). The method of manufacture from 2-nitroaniline-4-sulphonic acid described therein is, however, too expensive for technical purposes.

In accordance with the present invention the said dinitro-diphenyl-disulphonic acid and further the corresponding diamino compound are produced from diphenyl in a simple manner and in a good yield and purity. The process of the invention is by sulphonating diphenyl to diphenyl-4.4'-disulphonic acid by means of an excess of concentrated sulphuric acid, monohydrate or oleum containing about 20% $SO_3$ and then introducing two nitro groups into the diphenyl disulphonic acid by means of a sulphuric acid-nitric acid mixture. The resulting dinitro disulphonic acid is then converted into 2.2'-diamino-diphenyl-4.4'-disulphonic acid by means of known reducing agents, such as for example, iron and hydrochloric acid.

The following example illustrates the invention, without however, restricting it thereto:—

100 kgs. of diphenyl are heated gradually to 90° C. with about 500 kgs. of sulphuric acid monohydrate and stirred for several hours at this temperature. The mixture is then cooled to 40° C. and 280 kgs. of mixed acid (33% nitric acid and 67% sulphuric acid) are caused to run in at about 40–50° C. and stirred for several hours at 80° C. Thereafter the liquor is poured on to ice and the 2.2'-dinitro-diphenyl-4.4'-disulphonic acid is salted out with common salt, filtered by suction, washed with common salt solution and dried.

The sulphochloride of the resulting dinitro-diphenyl-disulphonic acid (after once crystallizing from glacial acetic acid) melts at 166–167° C. (according to Ullmann 167° C.).

The 2.2'-dinitro-diphenyl-4.4'-disulphonic acid thus obtained is made into a paste with water and reduced in the customary manner by means of 600 kgs. of iron and 60 litres of a 20% solution of hydrochloric acid.

The 2.2'-diamino-diphenyl-4.4'-disulphonic acid is extracted from the reduction mass by means of sodium carbonate and the pure diamino-diphenyl-disulphonic acid is precipitated in good yield by means of hydrochloric acid.

The production of this compound from diphenyl was hitherto not known and it could not be anticipated that the said product was obtainable technically in such a simple and smooth manner.

We claim:—

1. The process which comprises sulphonating diphenyl to form 4.4'-disulphonic acid, nitrating the diphenyl-4.4'-disulphonic acid, and reducing the 2.2'-dinitro-diphenyl-4.4'-disulphonic acid to the 2.2'-diamino-diphenyl-4.4'-disulphonic acid.

2. The process which comprises heating diphenyl in sulphuric acid monohydrate to 90° C., keeping the reaction mixture at this temperature for several hours, allowing the reaction mixture to cool down to 40° C., introducing nitrating acid, stirring for several hours at 80° C. isolating the 2.2'-dinitro-diphenyl-4.4'-disulphonic acid and reducing the same with iron and hydrochloric acid.

In testimony whereof, we affix our signatures.

EDUARD TSCHUNKUR.
ERNST KRACHT.